(12) United States Patent
Kitami et al.

(10) Patent No.: US 7,740,698 B2
(45) Date of Patent: Jun. 22, 2010

(54) NON-ASBESTOS FRICTION MATERIAL

(75) Inventors: Takuya Kitami, Tokyo (JP); Hiroshi Isobe, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 11/963,074

(22) Filed: Dec. 21, 2007

(65) Prior Publication Data

US 2008/0156226 A1 Jul. 3, 2008

(30) Foreign Application Priority Data

Dec. 27, 2006 (JP) ............................ P.2006-352304

(51) Int. Cl.
*C09K 3/14* (2006.01)
*C08J 5/14* (2006.01)
*F16D 69/02* (2006.01)

(52) U.S. Cl. ........................................ 106/36; 523/149

(58) Field of Classification Search .................. 106/36; 523/149

See application file for complete search history.

(56) References Cited

U.S. PATENT DOCUMENTS

| | | | | |
|---|---|---|---|---|
| 4,374,211 A | * | 2/1983 | Gallagher et al. | 523/156 |
| 5,106,887 A | * | 4/1992 | Horiguchi | 523/155 |
| 5,147,588 A | * | 9/1992 | Okura et al. | 264/29.7 |
| 5,217,528 A | * | 6/1993 | Seki | 106/36 |
| 5,360,842 A | * | 11/1994 | Seki et al. | 524/15 |
| 5,866,636 A | * | 2/1999 | Nitto et al. | 523/155 |
| 5,888,645 A | | 3/1999 | Lindgaard et al. | |
| 5,891,933 A | | 4/1999 | Kesavan et al. | |
| 5,895,716 A | | 4/1999 | Fiala et al. | |
| 6,284,815 B1 | * | 9/2001 | Sasahara et al. | 523/149 |
| 6,413,622 B1 | * | 7/2002 | Kobayashi | 428/293.1 |
| 6,451,872 B1 | * | 9/2002 | Yamane | 523/156 |
| 6,479,413 B1 | | 11/2002 | Booher | |
| 6,596,789 B2 | * | 7/2003 | Nakamura et al. | 523/155 |
| 6,617,375 B2 | * | 9/2003 | Kobayashi et al. | 523/156 |
| 6,656,240 B2 | * | 12/2003 | Chiba | 51/307 |
| 2003/0059605 A1 | * | 3/2003 | Kesavan | 428/331 |
| 2004/0164438 A1 | | 8/2004 | Lamport | |
| 2006/0257647 A1 | | 11/2006 | Takagi et al. | |

FOREIGN PATENT DOCUMENTS

| | | |
|---|---|---|
| EP | 0 507 564 A2 | 10/1992 |
| EP | 1 388 684 A1 | 2/2004 |
| JP | 58-61169 | 4/1983 |
| JP | 2002-138273 | 5/2002 |
| JP | 2004-155843 | 6/2004 |

OTHER PUBLICATIONS

Search Report and Written Opinion for related French Application No. 0760362.

* cited by examiner

*Primary Examiner*—Anthony J Green
(74) *Attorney, Agent, or Firm*—Finnegan, Henderson, Farabow, Garrett & Dunner, L.L.P.

(57) ABSTRACT

A non-asbestos friction material not containing a heavy metal and a heavy metallic compound as the blending ingredients of the friction material is provided with graphite and coke in total from 5 to 25 vol % in volume of friction material. A volume ratio of the graphite/coke is preferably from 2/1 to 7/1. An average particle size of the coke is preferably from 150 to 400 μm.

4 Claims, No Drawings

NON-ASBESTOS FRICTION MATERIAL

This application claims foreign priority from Japanese Patent Application No. 2006-352304 filed on Dec. 27, 2006, the entire contents of which are hereby incorporated by reference.

BACKGROUND OF THE INVENTION

1. Field of the Invention

The present invention relates to a non-asbestos friction material. In particular, the present invention relates to a friction material for use in industrial equipments, railcars, baggage cars and passenger cars, which is improved in balance controlling performance between wear resistance, preventing ability of metal catch, cracking resistance, and braking ability. Particularly, the present invention relates to a friction material capable of preventing environmental pollution by not containing metals and metallic compounds. More specifically, the invention relates to brake pads, brake linings and clutch facings for use in the above uses.

2. Related Art

Friction materials for use in brakes such as disc brakes and drum brakes or clutches include a friction modifier for giving friction ability and controlling the friction ability, a fibrous material for reinforcement, and a binder to integrate these components. Of these materials, the fibrous material may include the kinds of a metallic fibers an inorganic fiber, and an organic fiber. These fibers have respective characteristics and one kind alone cannot satisfy all the requirements, so that two or more kinds are usually used in combination.

On the other hand, as materials for controlling friction characteristics of the friction material, there are the friction modifier and a solid lubricant. These materials also include inorganic and organic materials, and they have respective characteristics and one kind alone cannot satisfy all the requirements, so that they are usually used in combination of two or more kinds. As the examples of friction modifiers, inorganic friction modifiers, e.g., alumina, silica, magnesia, zirconia, chromium oxide, quartz, etc., and organic friction modifiers, e.g., synthetic rubber, cashew resin, etc, are exemplified. As solid lubricants, e.g., graphite, molybdenum disulfide, etc., are exemplified.

As fillers, barium sulfate, calcium carbonate, metallic powder, vermiculite, mica and the like are used.

As friction materials obtained by blending these ingredients capable of restraining the attack on the mating member, and improved in fading resistance and wear resistance, non-asbestos friction materials of various kinds of blending are suggested.

Various advantages can be obtained by blending a metal in the form of a metallic fiber or metallic powder into the friction material, such that structural reinforcement may be achieved, adhesive frictional force by transfer to the mating member may be obtained, high thermal conductivity and heat radiation may be ensured, so that various kinds of metals have been used hitherto.

However, various environmental problems caused by these metals are posed in these days such as pollution of river and ocean, harmful effect on human body and the like, and the countermeasures are now required.

As an example of the countermeasures, JP-A-2004-155843 discloses a non-asbestos friction material manufactured by molding a non-asbestos friction material composition mainly including a fibrous material containing at least a steel fiber excluding asbestos, a binder, and a filler, and curing the molded product, wherein a petroleum coke having an average particle size of from 50 to 150 μm and hard inorganic particles having an average particle size of from 5 to 30 μm are contained. JP-A-2004-155843 discloses that the non-asbestos friction material is capable of responding to the requirements of customers for the latest friction material increased in performance, light weight, miniaturization, and low costs, and is well balanced in wear resistance and friction coefficient and, further, hardly accompanied by squeaky noise and foreign sound at the time of braking. However, as is clearly shown in Examples 1 to 5 of Table 1 of JP-A-2004-155843, since this non-asbestos friction material contains 10 vol % of copper powder, there is the possibility of causing harmful influences on human body and environment.

Similarly, JP-A-58-061169 discloses a non-asbestos friction material composition suitable for use as a friction element essentially including a thermosetting binder, a fibrous reinforcing material, and Aramid polymer pulp fiber in an effective amount to form good structural integrity of the preform manufactured from the friction material, which is a friction material improved in bending strength, friction coefficient and wear resistance. However, the friction material composition contains a copper fiber and a brass fiber or copper and brass as the metal powders, so that there is the possibility of causing harmful influences on human body and environment similarly to JP-A-2004-155843.

Further, for the purpose of securing wear resistance at high temperature high load, the friction material contains metal sulfide.

However, certain kinds of metal sulfides are ascertained to have influences on human body and environment, and further expensive, so that disadvantageous from the aspect of manufacturing costs.

For the purpose of providing a friction material for brake not containing materials containing heavy metals such as Cu, antimony and the like, JP-A-2002-138273 discloses the technique of manufacturing a friction material for brake containing a fiber component, a binding component and a friction controlling component, wherein magnesium oxide (MgO) and graphite are contained in the friction material in an amount of from 45 to 80 vol %, and the volume ratio of the magnesium oxide to graphite (MgO/graphite) is from 1/1 to 4/1.

JP-A-2002-138273 discloses that the invention can provide a friction material for brake having high temperature friction performance and mechanical characteristics the same or higher than those of conventional non-asbestos friction materials even when heavy metals and heavy metal compounds such as a Cu fiber, Cu powder and Sb2S3 powder are not contained.

SUMMARY OF THE INVENTION

One or more embodiments of the present invention provide a non-asbestos friction material having friction characteristics such as security of excellent braking effect, prevention of metal catch, and cracking resistance and not containing a hazardous metal and metallic compound, in addition to the high temperature friction performance and mechanical characteristics of the friction material for brake disclosed in JP-A-2002-138273.

The invention has been achieved by perceiving that wear resistance at high temperature can be ensured and attacking on the mating member can be restrained to a low degree while maintaining high friction coefficient by blending an appropriate amount of graphite and coke together as a part of the friction modifier of the friction material even when a hazardous metal and metallic compound are not used. Further, in the description and claims of the present application, the "hazardous metal" means "heavy metal", and the "hazardous metallic compound" means "heavy metal compound", because heavy metals or heavy metal compounds are hazardous.

In accordance with one or more embodiments of the invention, a non-asbestos friction material not containing a heavy metal and a heavy metallic compound as blending ingredients of the friction material and containing graphite and coke from 5 to 25 vol % in total volume of the friction material is provided.

In the non-asbestos friction material, the volume ratio of the graphite/coke may be from 2/1 to 7/1.

In the non-asbestos friction material, the average particle size of the coke may be from 150 to 400 µm.

The non-asbestos friction material may include at least one of zirconium silicate and zirconium oxide having particle diameters of 3 µm to 20 µm in 3 vol % to 10 vol % of total volume of a whole friction material.

According to the embodiments of the invention, in the non-asbestos friction material including a fibrous material for reinforcement, a friction modifier, and a binder for integrating these materials, by using graphite and coke in combination as a part of the friction modifier without using hazardous metals and metallic compounds that cause problems in the light of environment protection, wear loss at sliding time at high temperatures (300° C. and 400° C.) can be made equivalent to that in conventional friction materials using metal sulfide, materials of environmental load can be reduced, and the costs of materials can be decreased.

In addition, by using in combination of graphite and coke that is inferior in a lubricating property to graphite in a specific amount (vol %) and in a specific volume ratio, the relationship of friction and lubrication can be controlled. As a result, a balance between wear resistance, preventing ability of metal catch, cracking resistance, and braking ability is improved. In particular, wear resistance at high temperature and characteristics of preventing metal catch can be revealed without using metal sulfide.

Further, by blending at least one of zirconium silicate and zirconium oxide having particle diameters of 3 µm to 20 µm in 3 vol % to 10 vol % of total volume of a whole friction material, DTV (Disc Thickness Variation) progress can be decrease, braking effect can be improved, and NVH characteristic (noise, vibration, harshness) can be favorable.

Other aspects and advantages of the invention will be apparent from the following description and the appended claims.

DETAILED DESCRIPTION OF THE EXEMPLARY EMBODIMENTS

Exemplary embodiments of the invention will be described below.

In a non-asbestos friction material in the exemplary embodiments, by blending graphite and coke together as a part of a friction modifier of the friction material in total of from 5 to 25 vol % and in a volume ratio of the graphite to the coke from 2/1 to 7/1, friction at high temperature (300° C. and 400° C.), wear resistance, preventing ability of metal catch, and cracking resistance of the non-asbestos friction material can be made the same as those of conventional friction materials using metal sulfide and a copper fiber.

When blending amount of graphite and coke is less than 5 vol %, the amount is too small to reveal sufficient friction at high temperature and wear resistance. While when the amount is more than 25 vol %, the higher friction and wear resistance cannot be exhibited, which is uneconomical and braking effect lowers, since lubricating characteristics increases. Therefore, the content is preferably from 5 to 25 vol %, and more preferably from 12 to 18 vol % considering the compatibility of braking effect and wear.

The friction material in the exemplary embodiments can be produced by blending various ingredients of the friction material including a fibrous material, a friction modifier, a lubricant, a filler, and a binder, preforming the blended product, and thermoforming. In the above materials, as the fibrous materials, for example, organic fibers such as aromatic polyamide fibers, flame-resistant acryl fibers, etc., and inorganic fibers such as potassium titanate fibers, $Al_2O_3$—$SiO_2$ series ceramic fibers, etc., are exemplified. As the inorganic fillers, for example, scaly inorganic substances such as vermiculite, mica, etc., barium sulfate, calcium carbonate, etc., are exemplified.

It is a requisite in the invention that the above various ingredients for the friction material do not contain heavy metals and heavy metallic compounds.

The heavy metals here mean, in addition to substances large in malleability and ductility such as iron, copper and zinc, heavy metals having density of 4.0 or 5.0 g/cm³ or more, e.g., iron, copper lead, manganese and chromium.

As the binders, thermosetting resins, for example, phenolic resins (including straight phenolic resins, various modified phenolic resins by rubber and the like), melamine resins, epoxy resins, polyimide resins, etc., are exemplified. Further, as the friction modifiers, metallic oxides, for example, silica, magnesia, zirconia, chromium oxide, etc., and organic friction modifiers such as synthetic rubbers, cashew resins, etc., are exemplified. As the solid lubricants, for example, graphite, molybdenum disulfide, etc., are exemplified. As the composition of the friction material, various proportions of compositions can be adopted. That is, these compounds can be used alone or in combination of two or more according to the friction characteristics required of the product, for example, a friction coefficient, wear resistance, preventing ability of metal catch, cracking resistance, and the like.

Graphite generally used in friction materials can be used as the graphite for use in the invention, and either natural graphite or artificial graphite can be used. The average particle size of graphite is preferably from 5 to 500 µm (micro meter), and more preferably from 50 to 150 µm.

As the cokes in the exemplary embodiments, cokes having an average particle size of from 150 to 400 µm are used. When the average particle size is less than 150 µm, wear resistance at a high temperature region cannot be improved, while when it is greater than 400 µm, segregation occurs. The addition amount of coke is preferably from 3 to 30 vol % in total with graphite based on all the amount of the non-asbestos friction material. In this range of the amount, wear resistance at a high temperature region is improved and, further, a friction coefficient is also stably maintained on a satisfactory level.

There are coal coke and petroleum coke in the kinds of cokes, and either can be used in the exemplary embodiment. Coal cokes manufactured with fine coals as the ingredient are expensive and hard to use, but petroleum cokes vary little in quality, inexpensive and easily available, so that it is preferred to use petroleum cokes.

The volume ratio of graphite to coke is preferably from 2/1 to 7/1, and the relationship between friction and lubrication can be well controlled in this range of the volume ratio.

EXAMPLE

The invention will be described more specifically with reference to examples, but the invention should not be construed as being restricted thereto.

Examples 1 to 6

Comparative Examples 1 to 3

And Reference Examples 1 to 3

A friction material was manufactured by mixing the blending ingredients of a friction material having the composition as shown in Table 1 below in a mixer for 5 minutes, putting the thoroughly stirred and mixed materials in a die, preforming and thermoforming. Preforming was performed by the application of pressure of 10 MPa for 10 seconds. The preformed product was molded at molding temperature of 150° C. and molding pressure of 52.9 MPa for 5 minutes, and subjected to heat treatment (post-curing) at 250° C. for 20 to 100 minutes, coating, baking and polishing, thereby obtaining friction materials of base material, Examples, Comparative Examples and Reference Examples. These friction materials were subjected to JASO performance test and the test of cracking resistance with a dynamometer. The obtained results of evaluations of performances are shown in Table 1.

(1) Friction Coefficient, Wear Resistance

After JASO performance test (JASO, C406) of these friction materials, wear loss of each friction material was measured.
  Material of rotor: cast iron (FC200)
  Initial speed of braking: 20, 50, 100, 130 km/h
  Deceleration of braking: 2.94 m/s²
  Braking test was performed after ten times of braking on the above condition, at initial speed of braking of 100 km/h, deceleration of 4.4 m/s², repetition of two cycles of fade section with ten times of braking as one cycle, and after facing up both materials, one more time at initial speed of braking of 20, 50, 100, 130 km/h, and deceleration of 2.94 m/s². After termination of the test, wear losses of the friction material and the mating member (rotor) were measured.

(2) Preventing Ability of Metal Catch

After JASO performance test (JASO, C406) described in the above item (1), the slid surface of the friction material was observed.

(3) Cracking Resistance
  Material of rotor: cast iron (FC200)
  Initial speed of braking: 50 km/h
  Deceleration of braking: 2.94 m/s²
  Initial temperature of the rotor: 95° C.
  Number of times of braking: 3 times After ascertaining the base line on the above condition, braking in total of ten times was performed at initial speed of braking of 100 km/h, deceleration of braking of 4.41 m/s², and initial temperature of the rotor of the first time of from 65° C. at intervals of 35 seconds, and fade phenomenon was reproduced. (The temperature of the rotor after the tenth braking varies by various factors of vehicles, but is approximately from 550 to 650° C. or so).

After that, the recovery from fade was reproduced by performing 15 times of braking at initial speed of braking of 50 km/h, and deceleration of braking of 2.94 m/s² at intervals of 120 seconds. Taking this procedure as one cycle, test of four cycles in total is done, and chip and crack of the friction material are visually observed after termination of the test.

Of the ingredients of the friction material shown in Table 1, novolak type phenolic resin was used as the binder resins, and a cellulose fiber as the organic fiber, and tin sulfide as the metal sulfide were respectively used.

TABLE 1

Contents of blending and test results

|  | Example 1 | Example 2 | Example 3 | Example 4 | Example 5 | Example 6 |
|---|---|---|---|---|---|---|
| Binder resin | 15 | 15 | 15 | 15 | 15 | 15 |
| Cashew dust | 10 | 10 | 10 | 10 | 10 | 10 |
| Barium sulfate | 34 | 28 | 25 | 22 | 19 | 16 |
| Calcium carbonate | 13 | 13 | 13 | 13 | 13 | 13 |
| Calcium hydroxide | 2 | 2 | 2 | 2 | 2 | 2 |
| Phlogopite | 5 | 5 | 5 | 5 | 5 | 5 |
| Organic fiber | 10 | 10 | 10 | 10 | 10 | 10 |
| Zirconium silicate | 5 | 5 | 5 | 5 | 5 | 5 |
| Graphite | 4 | 8 | 10 | 12 | 14 | 16 |
| Petroleum coke | 2 | 4 | 5 | 6 | 7 | 8 |
| Tin sulfide | — | — | — | — | — | — |
| Copper fiber | — | — | — | — | — | — |
| Graphite + petroleum coke | 6 | 12 | 15 | 18 | 21 | 24 |
| Friction coefficient, 20 km/h | C | B | A | B | C | C |
| Friction coefficient, 130 km/h | B | A | B | B | B | C |
| Wear loss | B | B | A | A | A | A |
| Preventing ability of metal catch | C | B | B | A | A | A |
| Cracking resistance | B | B | B | B | B | B |

|  | Comparative Example 1 | Comparative Example 2 | Comparative Example 3 |
|---|---|---|---|
| Binder resin | 15 | 15 | 15 |
| Cashew dust | 10 | 10 | 10 |

TABLE 1-continued

| Contents of blending and test results | | | |
|---|---|---|---|
| Barium sulfate | 30 | 37 | 13 |
| Calcium carbonate | 13 | 13 | 13 |
| Calcium hydroxide | 2 | 2 | 2 |
| Phlogopite | 5 | 5 | 5 |
| Organic fiber | 10 | 10 | 10 |
| Zirconium silicate | 5 | 5 | 5 |
| Graphite | 10 | 2 | 18 |
| Petroleum coke | — | 1 | 9 |
| Tin sulfide | — | — | — |
| Copper fiber | — | — | — |
| Graphite + petroleum coke | 10 | 3 | 27 |
| Friction coefficient, 20 km/h | C | D | D |
| Friction coefficient, 130 km/h | C | C | D |
| Wear loss | C | C | A |
| Preventing ability of metal catch | D | D | A |
| Cracking resistance | D | D | B |

|  | Base Material | Reference Example 1 | Reference Example 2 | Reference Example 3 |
|---|---|---|---|---|
| Binder resin | 15 | 15 | 15 | 15 |
| Cashew dust | 10 | 10 | 10 | 10 |
| Barium sulfate | 20 | 25 | 25 | 20 |
| Calcium carbonate | 13 | 13 | 13 | 13 |
| Calcium hydroxide | 2 | 2 | 2 | 2 |
| Phlogopite | 5 | 5 | 5 | 5 |
| Organic fiber | 10 | 10 | 10 | 10 |
| Zirconium silicate | 5 | 5 | 5 | 5 |
| Graphite | 10 | 10 | 10 | 10 |
| Petroleum coke | — | — | — | — |
| Tin sulfide | 5 | 5 | — | 2 |
| Copper fiber | 5 | — | 5 | 5 |
| Graphite + petroleum coke | 10 | 10 | 10 | 13 |
| Friction coefficient, 20 km/h | B | C | C | B |
| Friction coefficient, 130 km/h | B | C | B | B |
| Wear loss | A | B | D | B |
| Preventing ability of metal catch | A | B | C | A |
| Cracking resistance | B | C | C | B |

\* The content of blending is based on volume %.
A: Very good,
B: Good,
C: Utmost possible limit,
D: Bad As the base material, cashew dust formed with furfural as the curing agent was used, and metal sulfide and copper fiber were contained. In addition to the above, barium sulfate, calcium carbonate, a pH adjustor (calcium hydroxide), mica, an organic fiber, zirconium silicate and graphite were blended as the base material. The comparative materials were prepared by excluding copper fiber from the base material as Reference Example 1, deleting metal sulfide as Reference Example 2, and excluding both as Comparative Example 1.

Examples 7 to 10 and Comparative Examples 4 to 6

As Example and Comparative Example, the ratio of graphite to coke was examined by changing the amounts of both. A friction material was manufactured by mixing the blending ingredients of the friction material having the composition as shown in Table 2 below and molding in the same manner as in Example 1.

TABLE 2

| The ratio of graphite to coke | | | | |
|---|---|---|---|---|
|  | Example 7 | Example 8 | Example 9 | Example 10 |
| Binder resin | 15 | 15 | 15 | 15 |
| Cashew dust | 10 | 10 | 10 | 10 |
| Barium sulfate | 25 | 24 | 25 | 24 |
| Calcium carbonate | 13 | 13 | 13 | 13 |
| Calcium hydroxide | 2 | 2 | 2 | 2 |
| Phlogopite | 5 | 5 | 5 | 5 |
| Organic fiber | 10 | 10 | 10 | 10 |
| Zirconium silicate | 5 | 5 | 5 | 5 |
| Graphite | 10 | 12 | 12 | 14 |
| Petroleum coke | 5 | 4 | 3 | 2 |
| Graphite/petroleum coke | 2/1 | 3/1 | 4/1 | 7/1 |
| Friction coefficient, 20 km/h | A | B | B | B |
| Friction coefficient, 130 km/h | B | A | A | A |
| Wear loss | A | A | A | B |
| Preventing ability of metal catch | B | A | A | A |
| Cracking resistance | B | B | B | B |

TABLE 2-continued

The ratio of graphite to coke

|  | Comparative Example 4 | Comparative Example 5 | Comparative Example 6 |
|---|---|---|---|
| Binder resin | 15 | 15 | 15 |
| Cashew dust | 10 | 10 | 10 |
| Barium sulfate | 25 | 24 | 22 |
| Calcium carbonate | 13 | 13 | 13 |
| Calcium hydroxide | 2 | 2 | 2 |
| Phlogopite | 5 | 5 | 5 |
| Organic fiber | 10 | 10 | 10 |
| Zirconium silicate | 5 | 5 | 5 |
| Graphite | 5 | 8 | 16 |
| Petroleum coke | 10 | 8 | 2 |
| Graphite/petroleum coke | 1/2 | 1/1 | 8/1 |
| Friction coefficient, 20 km/h | C | C | D |
| Friction coefficient, 130 km/h | D | D | C |
| Wear loss | C | C | B |
| Preventing ability of metal catch | C | B | C |
| Cracking resistance | C | B | C |

* The content of blending is based on volume %.
A: Very good,
B: Good,
C: Utmost possible limit,
D: Bad The average particle size of the coke is preferably from 150 to 400 μm, and more preferably from 250 to 350 μm considering the wetting property of the binder resin and crack resistance. The sum total of the graphite and coke is preferably from to 25 vol %, and more preferably from 12 to 18 vol % taking the compatibility of braking effect and wear resistance into consideration. The ratio of the graphite to coke is preferably from 2/1 to 7/1 considering braking effect, wear loss, preventing ability of metal catch, and crack resistance.

Wear test by temperature was performed in connection with the base material, Comparative Example 1 not containing copper and tin sulfide, and Example 2 containing graphite and coke. The results of the test are shown in Table 3 below.

TABLE 3

The results of wear test by temperature

| | Base Material | | Comparative Example 1 | | Example 2 | |
|---|---|---|---|---|---|---|
| Temperature (° C.) | Volume Wear Rate | Average μ | Volume Wear Rate | Average μ | Volume Wear Rate | Average μ |
| 100 | 0.12 | 0.38 | 0.13 | 0.39 | 0.12 | 0.37 |
| 150 | 0.09 | 0.41 | 0.10 | 0.40 | 0.10 | 0.42 |
| 200 | 0.17 | 0.47 | 0.22 | 0.48 | 0.17 | 0.48 |
| 300 | 0.28 | 0.46 | 0.52 | 0.50 | 0.30 | 0.46 |
| 400 | 0.25 | 0.43 | 0.76 | 0.52 | 0.28 | 0.45 |

* Volume wear rate is represented by (D$10^{-4}$ mm$^3$/Nm)

An wear loss test was carried out with each of the manufactured friction materials for brake and the rotor shown below by a full size dynamometer. The test condition is as follows.

Material of Rotor: Cast Iron (FC200)

The test was performed with a full size dynamometer on the condition of initial temperature of the rotor of 100, 150, 200, 300 and 400° C., deceleration of braking of 1.47 m/s$^2$, initial speed of braking of 50 km/h, and the number of times of braking of 1,000 times. The wear loss and friction coefficient were measured at each temperature.

The friction material in Comparative Example 1 increased in wear loss at high temperature regions of 300 and 400° C. Contrary to this, the friction material in Example 2 could secure the same wear characteristic as that of the base material, and the braking effect was also almost equal to the base material.

According to the invention, wear resistance at high temperature can be secured even when a heavy metal and a heavy metal compound are not used, and a good result can be obtained with respect to contradictory braking effect, so that it is possible to provide a friction material that is inexpensive and considering environmental protection.

Experiment 1

(Consideration about Particle Diameter of Zirconium Silicate or the Like)

An experiment was carried out for considering effects by particle diameters of zirconium silicate and zirconium oxide blended in the friction material of the exemplary embodiments.

As the particle diameters of the blended the zirconium silicate and the zirconium oxide to be examined, four sizes are prepared. That is, under 3 μm, from 3 μm to 13 μm, from 13 μm to 20 μm, and over 20 μm. The zirconium silicate and/or the zirconium oxide were blended 5 vol % in the total volume of the friction material.

Samples were manufactured by mixing the blending ingredients of a friction material having the composition as shown in Table 4 in a mixer for five minutes, putting a thoroughly of stirred and mixed materials in a die, performing, and thermoforming. The performing was performed under a pressure of 10 MPa for 10 seconds. The preformed product was molded under molding temperature of 150° C. and molding pressure of 52.9 MPa for 5 minutes, and subjected to heat treatment (post-curing) at 250° C. for 20 to 100 minutes, coating, baking and polishing, thereby obtaining friction materials of base material, and examples A to H. These friction materials were subjected to JASO performance test and the test of cracking resistance with a dynamometer. The obtained results of evaluations of performances are shown in Table 4.

TABLE 4

| | | Base | A | B | C | D |
|---|---|---|---|---|---|---|
| Composition | Binder resin | 15 | 15 | 15 | 15 | 15 |
| | Friction dust | 10 | 10 | 10 | 10 | 10 |
| | Barium sulfate | 20 | 27 | 27 | 27 | 27 |
| | Calcium carbonate | 13 | 13 | 13 | 13 | 13 |
| | Calcium hydroxide | 2 | 2 | 2 | 2 | 2 |
| | Graphite | 10 | 10 | 10 | 10 | 10 |

TABLE 4-continued

|  |  |  |  |  |  |  |
|---|---|---|---|---|---|---|
|  | Coke |  | 3 | 3 | 3 | 3 | 3 |
|  | Phlogopite |  | 5 | 5 | 5 | 5 | 5 |
|  | Organic fiber |  | 10 | 10 | 10 | 10 | 10 |
|  | Zirconium silicate (μm) | under 3 μm | 5 | 5 |  |  |  |
|  |  | from 3 to 13 μm |  |  | 5 |  |  |
|  |  | from 13 to 20 μm |  |  |  | 5 |  |
|  |  | over 20 μm |  |  |  |  | 5 |
|  | Zirconium oxide (μm) | under 3 μm |  |  |  |  |  |
|  |  | from 3 to 13 μm |  |  |  |  |  |
|  |  | from 13 to 20 μm |  |  |  |  |  |
|  |  | over 20 μm |  |  |  |  |  |
|  | Copper fiber |  | 5 |  |  |  |  |
|  | Tin sulfide |  | 2 |  |  |  |  |
|  | Total |  | 100 | 100 | 100 | 100 | 100 |
| Friction characteristics JASO performance | Friction coefficient 50 kph 4 MPa |  | 0.42 | 0.40 | 0.42 | 0.44 | 0.48 |
|  | Friction coefficient 130 kph 4 MPa |  | 0.35 | 0.25 | 0.30 | 0.35 | 0.40 |
|  | Wear Loss of Rotor |  | 5 | 4 | 6 | 8 | 15 |
| Test 1 | Friction coefficient 60 km/h |  | 0.42 | 0.40 | 0.42 | 0.44 | 0.48 |
|  | Wear Loss of Rotor (μm) |  | 1.5 | 0.5 | 6.5 | 8.5 | 20.0 |
| Test 2 | DTV (μm) |  | 4.0 | 3.0 | 5.0 | 7.0 | 15.0 |
|  | Test in actual vehicle NVH characteristic |  | Good | Good | Good | Good | Bad |

|  |  |  | E | F | G | H |
|---|---|---|---|---|---|---|
| Composition | Binder resin |  | 15 | 15 | 15 | 15 |
|  | Friction dust |  | 10 | 10 | 10 | 10 |
|  | Barium sulfate |  | 27 | 27 | 27 | 27 |
|  | Calcium carbonate |  | 13 | 13 | 13 | 13 |
|  | Calcium hydroxide |  | 2 | 2 | 2 | 2 |
|  | Graphite |  | 10 | 10 | 10 | 10 |
|  | Coke |  | 3 | 3 | 3 | 3 |
|  | Phlogopite |  | 5 | 5 | 5 | 5 |
|  | Organic fiber |  | 10 | 10 | 10 | 10 |
|  | Zirconium silicate (μm) | under 3 μm |  |  |  |  |
|  |  | from 3 to 13 μm |  |  |  |  |
|  |  | from 13 to 20 μm |  |  |  |  |
|  |  | over 20 μm |  |  |  |  |
|  | Zirconium oxide (μm) | under 3 μm | 5 |  |  |  |
|  |  | from 3 to 13 μm |  | 5 |  |  |
|  |  | from 13 to 20 μm |  |  | 5 |  |
|  |  | over 20 μm |  |  |  | 5 |
|  | Copper fiber |  |  |  |  |  |
|  | Tin sulfide |  |  |  |  |  |
|  | Total |  | 100 | 100 | 100 | 100 |
| Friction characteristics JASO performance | Friction coefficient 50 kph 4 MPa |  | 0.40 | 0.42 | 0.44 | 0.48 |
|  | Friction coefficient 130 kph 4 MPa |  | 0.25 | 0.30 | 0.35 | 0.40 |
|  | Wear Loss of Rotor |  | 4 | 6 | 8 | 15 |
| Test 1 | Friction coefficient 60 km/h |  | 0.40 | 0.42 | 0.44 | 0.48 |
|  | Wear Loss of Rotor (μm) |  | 1.0 | 5.5 | 8.5 | 19.0 |
| Test 2 | DTV (μm) |  | 3.0 | 5.0 | 6.0 | 14.0 |
|  | Test in actual vehicle NVH characteristic |  | Good | Good | Good | Bad |

Test 1: Speed V = 60 km/h, rotor vibration 100 μm, Deceleration α = 0.3 G, Total Braking Times N = 1000 times
Test 2: V = 100→80, α = 0.3 G, V = 100 km/h, Idling hours 16 Hr The results show that, in the range of the particle diameters under 3 μm, the braking effects were low. In the range of the particle diameters over 20 μm, wear losses of the rotors increase so that attacks to the rotors become high. Accordingly, it is preferable that the particle diameter is set from 3 to 20 μm.

Experiment 2
(Consideration about Blending Amount of Zirconium Silicate or the Like)

An experiments was carried out for considering effects by blending amount of the zirconium silicate and the zirconium oxide in the friction material of the exemplary embodiments.

The particle sizes were set to 3 to 20 μm determined as preferable in the Experiment 1. Four kinds of blending amount of the zirconium silicate and the zirconium oxide were prepared. That is, 1 vol %, 3 vol %, 10 vol %, and 15 vol % in total volume of the friction materials. When both of the zirconium silicate and the zirconium oxide are used, the blending amounts were set to: 1 vol %+1 vol %, 3 vol %+3 vol %, and 7 vol %+7 vol %. 5 vol % for only zirconium silicate, and 5 vol % for only zirconium oxide were already examined in the Experiment 1.

Samples were manufactured by mixing the blending ingredients of a friction material having the composition as shown in Table 5 in a mixer for five minutes, putting a thoroughly of stirred and mixed materials in a die, performing, and thermoforming. The performing was performed under a pressure of 10 MPa for 10 seconds. The preformed product was molded under molding temperature of 150° C. and molding pressure of 52.9 MPa for 5 minutes, and subjected to heat treatment (post-curing) at 250° C. for 20 to 100 minutes, coating, baking and polishing, thereby obtaining friction materials of base material, and examples "a" to "k". These friction materials were subjected to JASO performance test and the test of cracking resistance with a dynamometer. The obtained results of evaluations of performances are shown in Table 5.

TABLE 5

|  |  | Base | a | b | c | d | e |
|---|---|---|---|---|---|---|---|
| Composition | Binder resin | 15 | 15 | 15 | 15 | 15 | 15 |
|  | Friction dust | 10 | 10 | 10 | 10 | 10 | 10 |
|  | Barium sulfate | 20 | 31 | 29 | 22 | 17 | 31 |
|  | Calcium carbonate | 13 | 13 | 13 | 13 | 13 | 13 |
|  | Calcium hydroxide | 2 | 2 | 2 | 2 | 2 | 2 |
|  | Graphite | 10 | 10 | 10 | 10 | 10 | 10 |
|  | Coke | 3 | 3 | 3 | 3 | 3 | 3 |
|  | Phlogopite | 5 | 5 | 5 | 5 | 5 | 5 |
|  | Organic fiber | 10 | 10 | 10 | 10 | 10 | 10 |
|  | Zirconium silicate from 3 to 20 μm | 5 | 1 | 3 | 10 | 15 |  |
|  | Zirconium oxide from 3 to 20 μm |  |  |  |  |  | 1 |
|  | Copper fiber | 5 |  |  |  |  |  |
|  | Tin sulfide | 2 |  |  |  |  |  |
|  | Total | 100 | 100 | 100 | 100 | 100 | 100 |
| Friction characteristics JASO performance | Friction coefficient 50 kph 4 MPa | 0.42 | 0.40 | 0.42 | 0.45 | 0.49 | 0.40 |
|  | Friction coefficient 130 kph 4 MPa | 0.35 | 0.25 | 0.30 | 0.36 | 0.42 | 0.25 |
|  | Wear Loss of Rotor | 5 | 4 | 6 | 8 | 15 | 4 |
| Test 1 | Friction coefficient 60 km/h | 0.42 | 0.40 | 0.42 | 0.44 | 0.48 | 0.40 |
|  | Wear Loss of Rotor (μm) | 1.5 | 0.5 | 6.5 | 12 | 25.0 | 0.5 |
| Test 2 | DTV (μm) | 4 | 3 | 5 | 8 | 18 | 3 |
|  | Test in actual vehicle NVH characteristic | Good | Good | Good | Good | Bad | Good |

|  |  | f | g | h | i | j | K |
|---|---|---|---|---|---|---|---|
| Composition | Binder resin | 15 | 15 | 15 | 15 | 15 | 15 |
|  | Friction dust | 10 | 10 | 10 | 10 | 10 | 10 |
|  | Barium sulfate | 29 | 22 | 17 | 26 | 22 | 18 |
|  | Calcium carbonate | 13 | 13 | 13 | 13 | 13 | 13 |
|  | Calcium hydroxide | 2 | 2 | 2 | 2 | 2 | 2 |
|  | Graphite | 10 | 10 | 10 | 10 | 10 | 10 |
|  | Coke | 3 | 3 | 3 | 3 | 3 | 3 |
|  | Phlogopite | 5 | 5 | 5 | 5 | 5 | 5 |
|  | Organic fiber | 10 | 10 | 10 | 10 | 10 | 10 |
|  | Zirconium silicate from 3 to 20 μm |  |  |  | 3 | 5 | 7 |
|  | Zirconium oxide from 3 to 20 μm | 3 | 10 | 15 | 3 | 5 | 7 |
|  | Copper fiber |  |  |  |  |  |  |
|  | Tin sulfide |  |  |  |  |  |  |
|  | Total | 100 | 100 | 100 | 100 | 100 | 100 |
| Friction characteristics JASO performance | Friction coefficient 50 kph 4 MPa | 0.42 | 0.45 | 0.49 | 0.42 | 0.45 | 0.49 |
|  | Friction coefficient 130 kph 4 MPa | 0.30 | 0.36 | 0.42 | 0.27 | 0.36 | 0.42 |
|  | Wear Loss of Rotor | 6 | 8 | 15 | 5 | 8 | 15 |
| Test 1 | Friction coefficient 60 km/h | 0.42 | 0.44 | 0.48 | 0.40 | 0.44 | 0.47 |
|  | Wear Loss of Rotor (μm) | 6.5 | 12 | 25.0 | 0.5 | 12 | 25.0 |
| Test 2 | DTV (μm) | 5 | 8 | 17 | 3 | 8 | 14 |
|  | Test in actual vehicle NVH characteristic | Good | Good | Bad | Good | Good | Bad |

The results show that, the friction coefficient was low in 1 vol %. In 15 vol %, although the friction coefficient was high, the wear loss of the rotor increases so that the attack to the rotor becomes high. Accordingly, it is preferable that the blending amount of the zirconium silicate or the zirconium oxide is set from 3 vol % to 10 vol %. When both of the zirconium silicate and the zirconium oxide are used, 10 vol % is preferable. However, in 14 vol %, there were disadvantage that the wear loss of the rotor increases and the like.

By blending graphite and coke that is inferior in a lubricating property to graphite at the same time in a proper volume ratio to the ingredients of a friction material as a part of the friction modifier, it is possible for the resulting non-asbestos friction material to have wear resistance at high temperature even when a hazardous metal and a hazardous metallic compound, especially a metal fiber, are not used, the attack on the mating member can be restrained while maintaining a high friction coefficient, cracking resistance can be ensured, and control of balance with braking effect is improved. Accordingly, the non-asbestos friction material in the invention is especially useful as the friction materials for use in industrial equipments, railcars, baggage cars and passenger cars, more specifically brake pads, brake linings and clutch facings for use in the above uses, and is favorable for environment.

While description has been made in connection with an exemplary embodiments and examples of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. A non-asbestos friction material comprising:
   a fibrous material;
   a friction modifier; and
   a binder;
   wherein the friction modifier comprises graphite and coke in total from 5 to 25 vol % in the friction material,
   the volume ratio of the graphite/coke is from 2/1 to 7/1,
   wherein an average particle size of the coke is from 150 to 400 μm (micro meter), and
   wherein the friction material does not contain any of iron, copper, zinc, lead, manganese and chromium and any compound of iron, copper, zinc, lead, manganese and chromium.

2. The non-asbestos friction material according to claim 1, further comprising:
   at least one of zirconium silicate and zirconium oxide having particle diameters of 3μ to 20 μm in 3 vol % to 10 vol % of total volume of a whole friction material.

3. A non-asbestos friction material comprising:
   a fibrous material;
   a friction modifier; and
   a binder;
   wherein the friction modifier comprises graphite and coke in total from 5 to 25 vol % in the friction material,
   an average particle size of the coke is from 150 to 400 μm (micro meter), and
   wherein the friction material does not contain any of iron, copper, zinc, lead, manganese and chromium and any compound of iron, copper, zinc, lead, manganese and chromium.

4. The non-asbestos friction material according to claim 3, further comprising:
   at least one of zirconium silicate and zirconium oxide having particle diameters of 3 μm to 20 μm in 3 vol % to 10 vol % of total volume of a whole friction material.

* * * * *